United States Patent
Reicin et al.

(10) Patent No.: US 6,244,290 B1
(45) Date of Patent: Jun. 12, 2001

(54) VALVE CONTAINMENT BAG

(75) Inventors: Edward E. Reicin, Skokie; Dennis W. O'Brien, Darien; James A. Parker, Lansing, all of IL (US)

(73) Assignee: MPC Containment Systems, Ltd., Chicago, IL (US)

( * ) Notice: Subject to any disclaimer, the term of this patent is extended or adjusted under 35 U.S.C. 154(b) by 0 days.

(21) Appl. No.: 09/289,068

(22) Filed: Apr. 8, 1999

(51) Int. Cl.[7] ............................... B65B 1/18; B65B 3/17; F16L 55/16; F16K 27/12
(52) U.S. Cl. ................ 137/312; 137/315.01; 137/559; 138/97; 138/104; 141/86; 141/88; 141/94; 222/108; 285/13; 285/45
(58) Field of Search ............................ 137/312, 375, 137/315.01, 551, 559; 138/149, 167, 168, 97, 104; 285/45, 47, 55, 13; 383/38, 42; 141/68, 86, 88, 94, 315; 220/724; 405/52

(56) References Cited

U.S. PATENT DOCUMENTS

| | | | |
|---|---|---|---|
| 1,108,840 | * | 8/1914 | Franke .................................. 137/375 |
| 2,985,552 | * | 5/1961 | Watanabe ............................. 137/375 |
| 3,044,915 | * | 7/1962 | Jacobsen .............................. 137/375 |
| 3,148,699 | * | 9/1964 | Shindler ............................... 137/312 |
| 3,310,322 | * | 3/1967 | Carroll ................................ 137/312 |
| 3,556,158 | * | 1/1971 | Schneider ............................ 137/375 |
| 4,046,406 | * | 9/1977 | Press et al. .......................... 138/149 |
| 4,112,967 | * | 9/1978 | Withem ................................ 137/375 |
| 4,207,918 | * | 6/1980 | Burns et al. ......................... 137/375 |
| 4,556,082 | * | 12/1985 | Riley et al. .......................... 137/375 |
| 4,696,324 | * | 9/1987 | Petronko .............................. 137/375 |
| 4,807,669 | * | 2/1989 | Prestidge, Sr. et al. ............. 137/375 |
| 5,186,577 | * | 2/1993 | Reicin et al. ........................ 137/312 |
| 5,511,573 | * | 4/1996 | Corte ................................... 137/312 |
| 5,713,394 | * | 2/1998 | Nygaard .............................. 137/375 |
| 5,725,009 | * | 3/1998 | Mallow, Sr. et al. ................ 137/375 |
| 5,941,287 | * | 8/1999 | Terito, Jr. et al. .................... 138/149 |

* cited by examiner

Primary Examiner—George L. Walton
(74) Attorney, Agent, or Firm—Laff, Whitesel & Saret, Ltd.

(57) ABSTRACT

A containment bag for installation over a fluid control valve is provided. The valve containment bag is configured to contain leaks emanating from fluid control valves connected in line between an associated first inlet pipe and a second outlet pipe. The inlet pipe and the valve form a first junction and the outlet pipe form a second junction which are to be housed, along with the valve itself, within said bag so that fluid leaking from the junctions leaks into the containment bag. The containment bag is formed of an impermeable fabric which encloses an internal volume sufficient to accommodate the control valve and the associated junctions. The impermeable fabric defines first and second openings between the internal volume and the external environment, the first opening has a diameter substantially equal to the outer diameter of the inlet pipe, and the second opening has a diameter substantially equal to an outer diameter of the outlet pipe. A re-sealable seam extends between the said first and seconds openings so that the bag may be opened and installed over a previously installed control valve. The re-sealable seam may then be re-sealed to close the containment bag, with said first pipe protruding from said first opening and said second pipe protruding from said opening.

22 Claims, 2 Drawing Sheets

VALVE CONTAINMENT BAG

BACKGROUND OF THE INVENTION

The present invention relates to an apparatus for containing fluids leaked from control valves, thereby preventing such fluids from contaminating the surrounding environment.

Modern industry abounds with examples wherein liquid chemicals are transported, stored, mixed, and otherwise manipulated via interconnected networks of pipes, storage tanks, mixers, and the like. Often the flow of such chemicals is controlled by the opening and closing of large fluid controls valves interposed between sections of pipe.

In the petroleum industry, for example, oil, gasoline, or other chemicals are often stored in large above ground storage tanks. The tanks are filled and the chemicals withdrawn via large pipes attached to the sides of the tanks. The flow of liquids into and out of the tanks is controlled by large shut off valves connected in line with the pipes attached to the sides of the tanks.

A problem with this arrangement and similar arrangements, is that leaks often form within the valves and at the joints between the valves and the pipes. In many cases, the chemicals leaking from such facilities will have a detrimental effect on the surrounding environment. Therefore, it is desirable to contain such leaks in order to prevent contamination of the surrounding environment. Containment, however, must be achieved in an economical manner. Further, because many of the facilities requiring some form of valve containment are already in existence, an apparatus for containing leaking fluids must be capable of being retrofit onto existing facilities. Another desirable feature of a containment apparatus is that it allows for visual inspection of the valve in order to determine whether or not a leak is present. Finally, an apparatus for containing leaks must allow unrestricted operation of the valve being contained. In other words, the valve actuator must be accessible for manual and/or automatic operation as required by the particular application. Such accessibility must be provided without compromising the containment function of the containment apparatus.

SUMMARY OF THE INVENTION

In light of the background given above, a primary object of the present invention is to provide an apparatus for containing fluids that may potentially leak from control valves and the piping connected thereto.

Another object of the present invention is to provide a sealed containment apparatus to prevent the collection of rain, snow and other materials commonly collected in open containment systems.

Still another object of the present invention is to provide a valve containment bag that may be installed over a valve that has been previously installed.

Still another object of the present invention is to provide a valve containment bag wherein the valve actuator protrudes from the bag, and the bag forms a liquid tight seal therewith to maintain the leak proof integrity of the containment bag.

All of these objects as well as others which will become apparent upon reading the detailed description of the preferred embodiments, are met by the valve containment bag and leak containment system herein disclosed.

In a preferred embodiment of the invention, an apparatus for containing fluids leaked from a fluid control valve is provided in the form of a bag-like structure formed of an impermeable synthetic fabric. Individual fabric panels are joined along a plurality of seams to form an enclosed space. In the preferred embodiment the bag has the general shape of a short-sided cube, with a pair of large square front and rear panels and narrower rectangular panels forming the sides therebetween.

Each large square panel defines an opening communicating between the interior and exterior of the bag. In general, the circular openings are chosen to match the perimeter of the pipes attached to the valve, or their associated connecting flange. In the preferred embodiment, the openings are circular with short fabric collars extending around the perimeters of the openings. The collars form an axial surface which may be clamped to the outer circumference of a pipe or a pipe's connecting flange. Other shaped openings may also be employed in those cases where the associated piping has other than a circular cross section. The top of the bag defines a third opening. This opening, rather than having a short collar, includes a much longer tapered sleeve.

A first re-sealable liquid tight seam, preferably in the form of a plastic zipper, extends between the first opening in the front panel and the opening at the end of the tapered sleeve attached to the top of the containment bag. A second re-sealable liquid tight seam, similar to the first, extends between the second opening in the rear panel and the opening at the end of the tapered sleeve. The re-sealable seams extend through the tapered sleeve, through the front and rear panels, and through the collars surrounding the first and second openings. Thus, when both re-sealable seams are opened, a single large opening is formed at the top of the bag extending all the way between the first and second openings in the front and rear panels. When the re-sealable seams are closed, three distinct openings are defined.

The valve containment bag of the present invention may be installed over a fluid control valve that has already been installed between associated inlet and outlet pipes. The re-sealable seams are both opened and the bag is simply pulled over the valve with the actuator protruding through the opening. The bag is oriented such that the inlet pipe extends through the first aperture in the front panel, and the outlet pipe extends through the second opening in the rear panel. Once the bag has been pulled over the valve, the main body of the valve as well as the joints between the valve its associated inlet and outlet pipes, are enclosed within the bag. The re-sealable seams are then closed over the valve and around the pipes. With the re-sealable seams closed, the collars around the first and second openings encircle the inlet and outlet pipes, and the tapered sleeve encircles the valve actuator. Clamps are then tightened around the collars and the tapered sleeve. Gasketing material and caulk may be employed to ensure an effective seal between the containment bag and the inlet and outlet pipes, and the valve actuator in order to seal the openings around the inlet and outlet pipes and the valve actuator.

In an embodiment of the invention, a system for containing leaks from control valves comprises a valve containment bag and a plastic insert provided to be placed around an irregularly shaped valve actuator. The insert provides a smooth, more regular outer surface for clamping the tapered sleeve to form a more reliable seal. Further, a sight glass may be installed through one of the panels of the bag to allow an inspector to visually determine whether fluid has leaked from the valve. The sight glass may be field installed so that it may be placed in the most accessible position possible. The sight glass may also be advantageously employed as a drain whereby fluid that has leaked into the bag may be safely removed and properly discarded.

DETAILED DESCRIPTION OF THE PREFERRED EMBODIMENT

Figure 1:
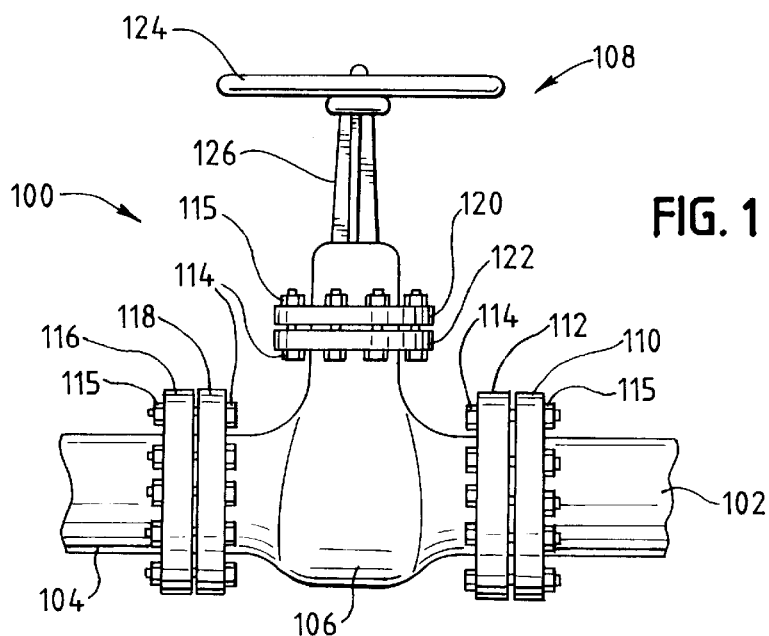
FIG. 1 is a plan view of a typical fluid control valve installed between first and second pipes.

In FIG. 1 a typical fluid control valve is shown at 100. Valve 100 is typical of the type of valves with which the present invention is to be employed. Valve 100 is shown installed between an inlet pipe 102 and an outlet pipe 104. The valve comprises a main body 106 and an actuator 108. The actuator shown includes a manually operated hand-wheel 124, and hand-wheel support 126. The manual hand wheel shown in FIG. 1 represents only one of many types of actuators that may employed. Many other style actuators are available, and the present invention is in no way limited to use only with hand wheel type actuators. The actuator 108 is mounted to the main body 106 by an actuator receiving flange 122 formed on the main body of the valve and a corresponding actuator connecting flange 120 formed on the actuator itself. The two flanges are mounted together and rigidly connected by a series of bolts 114 extending through both flanges and secured by nuts 115 on the opposite side.

Inlet pipe 102 and outlet pipe 104 are connected to the main body 106 in similar fashion. Inlet pipe 102 is formed with connecting flange 110, and outlet pipe 104 is formed having connecting flange 116. On the main body of the valve, the inlet and outlet ports are formed with an inlet port connecting flange 112, and an outlet port connecting flange 114, respectively. The inlet pipe connecting flange 110 is placed against the inlet port connecting flange 112 and the two are joined by bolts 114 extending through both flanges, and secured by nuts 115. Similarly, outlet pipe connecting flange 116 is placed against the outlet port connecting flange 118, and the two flanges are bolted together. If leaks develop in the valve, they most likely will occur at the joints between the valve and the pipes, or between the main body 106 and the actuator 108.

Figure 2:
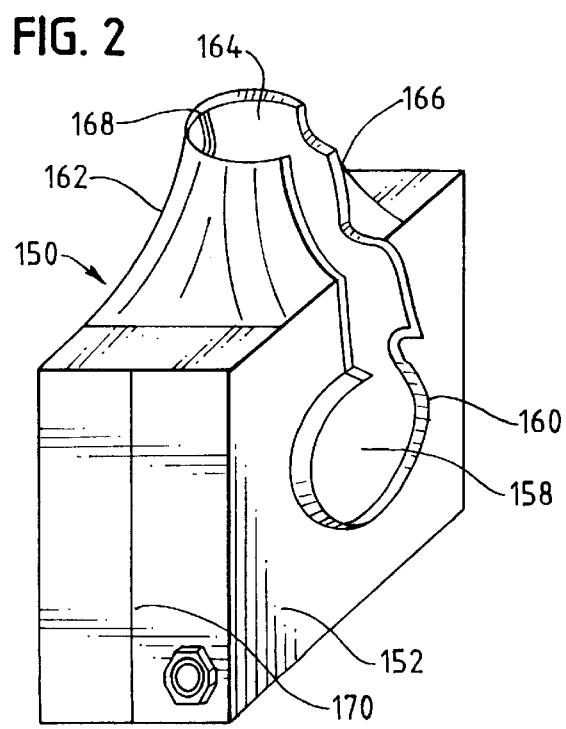
FIG. 2 is a perspective view of a valve containment bag according to the present invention prior to installation.

Turning to FIG. 2, a valve containment bag according to the present invention is shown at 150. Containment bag 150 is formed from a number of individual impermeable synthetic fabric panels. In the preferred embodiment of the invention, the impermeable fabric is formed of a high strength reinforcing fabric coated with an overall protective multi-polymer. The multi-polymer coating must be well suited for high temperature thermal welding, and compounded to resist attack by the product being carried the pipes and valves being contained. Also, the material must be ultra-violet stable so it will not degrade during its service life. In the preferred embodiment, the fabric panels comprise PETRO GARD® VI a high strength impermeable synthetic fabric manufactured by MPC Containment Systems, Ltd. of Chicago, Ill. Other suitable fabrics presently commercially available include PETRO GARD® X and CHEM GARD® 14.

Figure 6:
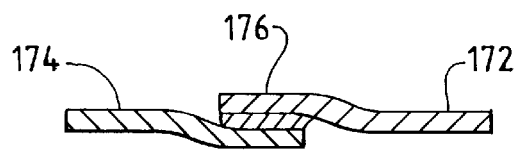
FIG. 6 is a cross sectional view of a welded seam between synthetic fabric panels.

The various fabric panels are joined at impermeable seams formed by a high pressure thermal welding process. Adjacent panel edges are placed in overlapping engagement, and subsequently heated to melt the polymer coating of the fabric. The melted plastic bonds the panels together to form a strong leak-proof seam. A cross sectional view of such a seam is shown in FIG. 6, wherein a first fabric panel 172 overlaps a second fabric panel 174, and seam 176 is formed when the two overlapping sheets are welded together.

Valve containment bag 150 includes a front panel 152 and a corresponding rear panel 153. Both the front and the rear panels define openings such as front opening 158 shown in FIG. 2. The front and rear openings allow the inlet and outlet pipes to pass through the valve containment bag 150. A short 160 collar formed of the same impermeable material lines the opening 158 through front panel 152. A similar collar, though not visible in FIG. 2, lines the opening in the rear panel 153. The front and rear panels are joined at seam 70. A rectangular bottom panel 155 encloses the bottom of containment bag 150.

The top panel is not continuous, but rather includes two separate panels 156, 157 adjacent the lateral sides of containment bag 150. A large opening bounded by the edges of the top panels 156, 157, and the front and rear panels 152, 153, is formed at the top of the valve containment bag 150. A tapered sleeve 162 is attached to the top panels 156, 157 as well as to the front and rear panels 152, 153. The tapered sleeve 162 forms a flexible transition from the square or rectangular opening formed at the top of the containment bag, to a more circular opening 164 at the end of the sleeve. The sleeve 162 is thermal welded to the top, front and rear panels by the same method described with regard to forming seams 170.

Two liquid-tight re-sealable seams 166, 168, preferably in the form of plastic zipper type fasteners, are formed in the front and rear of sleeve 162. The front and rear re-sealable seams extend through the full length of sleeve 162, through the front and rear panels 152, 153 to the front and rear openings respectively. Thus, the first re-sealable seam extends from the opening 164 at the end of the sleeve 162, through the sleeve, and though the front panel 152 and collar 160. In FIG. 2, the front re-sealable seam 166 is shown in an open condition such that a single continuous opening is formed at the top of the containment bag. As shown, the opening extends all the way between the front opening 158 and the sleeve opening 164. The rear re-sealable seam similarly extends from the sleeve opening 164, through the sleeve, through rear panel 153 and the rear collar to the rear opening (rear collar and rear opening not shown). In FIG. 2, the rear re-sealable seam 168 is shown in a closed condition. When the re-sealable seams are closed they form a liquid tight barrier such that fluid leaked into containment bag 150 cannot escape through the re-sealable seams.

Figure 5:
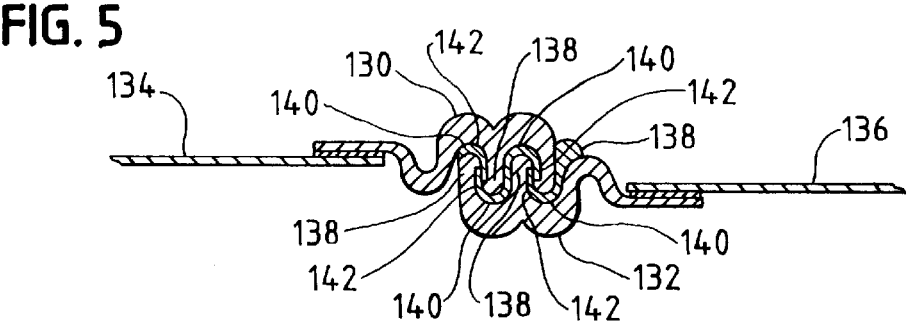
FIG. 5 is a cross sectional view of a plastic zipper employed in the preferred embodiment of the invention.

In FIG. 5 a cross sectional view of a plastic zipper is shown. The zipper comprises first and second zipper members 130, 132. First zipper member 130 is thermal welded to a first fabric panel 134, and second zipper member 132 is thermal welded to a second fabric panel 136. Zipper members 130, 132 include identical opposing mating structures. The mating structures comprise alternating hooks 138 and grooves 140. The zipper is closed by an actuator (not shown) which forces the hooks of each zipper member into the grooves of the other. When mated in this manner the hooks of each mating surface are held in opposition to one another, and the barbed projections 142 of the opposing hooks engage one another to hold the zipper in a closed, sealed position.

Figure 4:
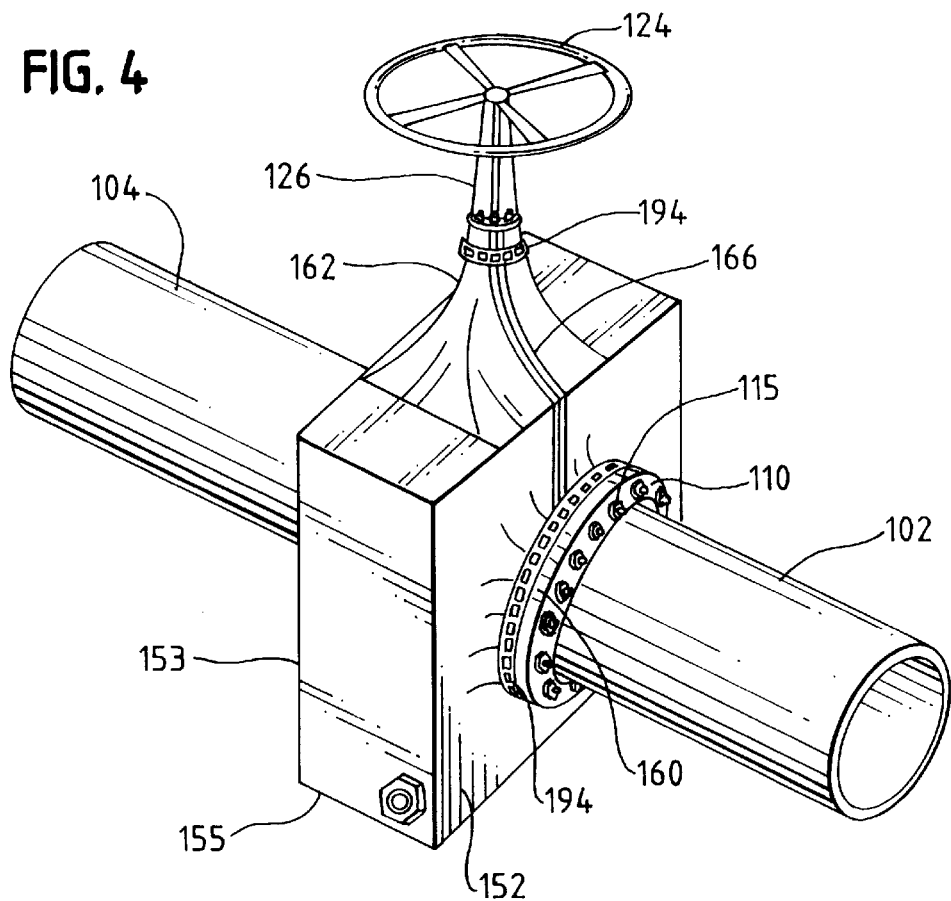
FIG. 4 is a perspective view of the valve containment bag of FIG. 2 installed over the valve shown in FIG. 1.

Referring now to FIGS. 1, 2 and 4, installation of a valve containment bag 150 according to the present invention over a control valve that has already been connected between corresponding inlet and outlet pipes will now be described. With both re-sealable seams 166, 168 open, a single continuous opening is formed at the top of the bag, extending from opening 158 in the front panel 152 to the corresponding opening formed in the rear panel 153. This single large opening may be pulled over the valve and pipe assembly so that the inlet pipe extends through the front opening 158, and the outlet pipe extends throughout the rear opening. The valve actuator protrudes through the yet to be closed opening at the top of the containment bag. The re-sealable seams 166, 168 may then be closed around the valve and pipe assemble. As shown in FIG. 4, the collar 160 lining the front opening 158, encircles the inlet pipe connecting flange 110. Though not shown, the rear collar lining the rear opening similarly encircles the outlet pipe connector flange 116. Beyond the front and rear openings the re-sealable seams 166, 168 entirely close and seal the front and rear panels, and tapered sleeve 162. Sleeve 162 encircles the actuator connecting flange 120, with the actuator itself extending above the opening 164 formed at the end of the sleeve.

Once the valve containment bag has been closed, circular clamps 194 formed of metal bands are tightened around the front and rear collars and sleeve 162. The clamps seal the openings to containment bag 150. Thus, the entire valve including both the inlet and outlet joints and the actuator joint, are enclosed within the bag. The closed bag forms an impermeable membrane completely enveloping the valve and adjacent portions of the inlet and the outlet pipes. Any fluids leaked from the valve or the connecting joints will be contained within the bag.

It should be noted that though the preferred embodiment describes front and rear collars being clamped to the inlet and outlet pipe connector flanges, alternately the collars may be clamped directly to the outer surfaces of the pipes themselves. Thus, the containment bag of the present invention will function equally well with valves that are connected to their associated inlet and outlet pipes in a manner different than that herein described.

Figure 3:
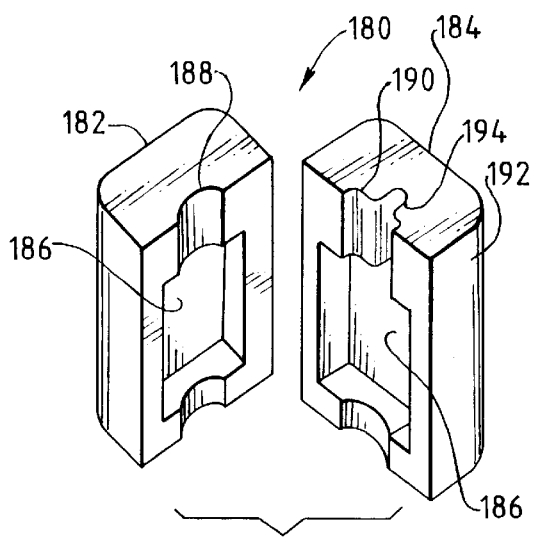
FIG. 3 is a perspective view of two piece insert according to one aspect of the present invention.

An alternate embodiment of the invention comprises a system for containing leaks emanating from fluid control valves. The system comprises a valve containment bag as previously described, coupled with an insert to be placed around the valve's actuator support member. This system is especially well adapted for use with valves having actuators with irregular surfaces around which it is difficult to clamp and seal the impermeable fabric comprising tapered sleeve 162. With valves of this type, the insert must be placed around the valve actuator in order to provide a smooth, more regular surface for clamping the sleeve. In FIG. 3, a valve insert is shown at 180. The insert comprises two similarly shaped pieces 182, 184. Each half of the insert includes an internal cavity 186 configured to receive irregular protruding aspects of the valve actuator. The insert pieces further include machined throat portions 190, 192 that closely match the contours of a section of the valve actuator. This can best be seen in throat portion 192 which includes an internal groove 194 configured to receive a corresponding ridge formed on the valve actuator. Thus, when the two insert halves 182, 184 are placed around the valve actuator, a liquid-tight seal is formed between the inner throat portion of the insert halves and the valve actuator. A gasket material may be included within throat portions 190, 192 to provide a better seal with the actuator. The outer perimeter surfaces 196 of the inserts are smooth, with no irregular projections or depressions, such that a circular clamp 198, similar to those employed in sealing the collars to the inlet and outlet pipe connector flanges, may be employed to seal the sleeve around the outer surfaces of the insert.

Finally, as shown in FIGS. 2 and 4, a sight glass 200 may be installed through one of the fabric panels comprising valve containment bag 150. Sight glasses are known in the art, and many different models are commercially available. Any model that provides a liquid tight seal with the surrounding fabric, and resists attack by the chemical being contained will suffice for the present application. The sight glass allows an inspector to visually inspect the contents of the valve containment bag in order to assess whether the valve assembly contained therein is leaking. The sight glass further provides a port through which leaked fluids may be drained from the containment bag without need of removing the bag. The sight glass is best installed in the field after the containment bag has been properly installed on a valve assembly. By waiting to install the sight glass after the bag is in place, the sight glass may be placed in the most advantageous position with respect to the surrounding equipment.

It should be noted that various changes and modifications to the present invention may be made by those of ordinary skill in the art without departing from the spirit and scope of the present invention which is set out in more particular detail in the appended claims. Furthermore, those of ordinary skill in the art will appreciate that the foregoing description is by way of example only, and is not intended to be limiting of the invention as described in such appended claims.

What is claimed is:

1. A containment bag for installation over a fluid control valve, the valve being connected in line between a first pipe and a second pipe, said first pipe and said valve forming a first junction and said second pipe and said valve forming a second junction, said containment bag comprising:
    an impermeable fabric enclosing an internal volume sufficient to accommodate said control valve;
    said impermeable fabric defining first and second openings between said internal volume and said external environment;
    a re-sealable liquid tight seam comprising first and second contiguously inter-engageable sealing members extending between said first open and said second opening whereby said bag may be opened and installed over said control valve and said first and second junctions, and the seam re-sealed to close said containment bag with said first pipe protruding from said first opening and said second pipe protruding from said second opening; and
    means for forming a liquid tight seal around said first opening between said containment bag and said first pipe; and
    means for forming a liquid tight seal around said second opening between said containment bag and said second pipe.

2. The containment bag of claim 1 wherein said means for forming said liquid tight seals around said first and second openings comprise flanged collars lining the perimeters of said first and second openings, and circular clamps for binding and sealing said collars to the outer diameters of said first and second pipes.

3. The containment bag of claim 1 wherein said valve includes a main body and an actuator assembly extending therefrom, said containment bag further defining a third opening allowing said actuator to protrude therethrough.

4. The containment bag of claim 3 further comprising an insert configured to surround and sealingly engage a portion of said actuator, said insert providing a relatively smooth mounting surface to which the fabric surrounding said third opening may be clamped and sealed.

5. The containment bag of claim 3 wherein said re-sealable liquid tight seam further comprises a first re-sealable liquid tight seam between said first opening and said third opening, and a second re-sealable seam between said second opening and said third opening.

6. The containment bag of claim 5 wherein said first and second re-sealable liquid tight seams comprise plastic zippers.

7. The containment bag of claim 1 further comprising a sight glass mounted through said impermeable fabric, said sight glass providing a view into said enclosed volume.

8. A containment system for fluids leaked from a fluid control valve and associated piping, wherein said associated piping includes at least an inlet pipe and an outlet pipe, both joined to respective inlet and outlet ports of said valve, said containment system comprising:

an impermeable membrane configured to envelop said valve and adjacent portions of said inlet and outlet pipes;

a liquid tight resealable seam comprising first and second contiguous inter-matable fasteners for closing said membrane around said valve and said adjacent portions of said inlet and outlet pipes; and clamps configured to seal said membrane around said adjacent portions of said inlet and outlet pipes.

9. The containment system of claim 8 wherein said inlet and outlet pipes each form a connector flange having a diameter greater than the diameter of said pipes, said containment system further comprising first and second openings which are formed when said membrane is closed around said valve, each said opening being lined with a short collar having a perimeter substantially equal to the respective connector flanges.

10. The containment system of claim 9 wherein said clamps comprise circular metal bands placed over an exterior surface of said collars and tightened over said connector flanges.

11. The containment system of claim 9 wherein said valve includes an actuator that extends from said valve, said containment system further comprising a third opening allowing said actuator to protrude therethrough.

12. The containment system of claim 11 further comprising an insert to be placed around said actuator, said insert providing a substantially smooth outer surface whereby said impermeable membrane surrounding said third opening may be clamped and sealed to the outer surface of the insert.

13. The containment system of claim 11 wherein said fastener comprises a first fastener extending between said first opening and said third opening, and a second fastener extending between said second opening and said third opening.

14. The containment system of claim 13 wherein said first and second liquid tight fasteners comprise plastic zippers.

15. The containment system of claim 8 further comprising a sight glass installed through said impermeable membrane so that fluids collected within said closed membrane may be viewed from outside said closed membrane.

16. A containment bag for containing fluids leaked from a control valve connected between a first pipe and a second pipe, said valve including a main body and an actuator extending from said main body, said containment bag comprising:

a plurality of panels formed of an impermeable fabric, said panels being joined at a plurality of seams to form an enclosed space;

a first panel defining a first pipe receiving aperture communicating between said enclosed space and a surrounding environment external to said bag;

a second panel defining a second pipe receiving a e communicating between said enclosed space and the surrounding environment;

a third panel defining a third aperture allowing said valve actuator to extend therethrough;

a first liquid tight resealable seam comprising first and second contiguous inter-matable fasteners extending from said first aperture to said third aperture, and a second liquid tight fastener extending between said second aperture and said third aperture;

whereby said bag may be installed over said valve, and said liquid tight fasteners closed around said valve with said first pipe sealingly protruding through said first aperture, said second pipe sealingly protruding through said second aperture, and said value actuator sealingly protruding through said third aperture.

17. The containment bag of claim 16 further comprising flanged collars lining the perimeters of said first and second apertures, and circular clamps for binding and sealing said collars to said first and second pipes.

18. The containment bag of claim 16 further comprising an insert for mounting to said actuator to provide a mounting surface for clamping the fabric surrounding said third aperture.

19. The containment bag of claim 18 wherein said insert comprises a pair of hard plastic blocks, each said block forming a half cylinder defining an internal flat mating surface, said flat mating surfaces being machined to fit around irregular non-circular components of said valve actuator, such that when said flat surfaces are placed together in mutual opposition around said actuator, a generally circular outer surface is provided to which said fabric surrounding said third aperture may be clamped.

20. The containment bag of claim 19 wherein said hard plastic blocks comprise high density polyethylene.

21. The containment bag of claim 16 wherein said liquid tight fasteners comprise plastic zippers.

22. The containment bag of claim 16 further comprising a field installed sight glass mounted through said impermeable fabric, providing a view into said enclosed volume.

* * * * *